2,720,445

METHOD FOR MAKING TITANIUM TRICHLORIDE

Robert A. Ruehrwein and Gordon B. Skinner, Dayton, Ohio, assignors to Monsanto Chemical Company, St. Louis, Mo., a corporation of Delaware No Drawing. Application October 31, 1952, Serial No. 318,103

4 Claims. (Cl. 23—87)

This invention relates to a novel method of producing titanium trichloride, and more specifically to a method of producing the titanium trichloride from titanium tetrachloride, titanium oxides, and carbon.

We have found that titanium tetrachloride, titanium oxides, and carbon will react to form titanium trichloride. The reactions which take place are probably represented by at least the following two equations:

(Eq. 1)
$$3TiCl_4 + TiO_2 + 2C \rightarrow 4TiCl_3 + 2CO$$

(Eq. 2)
$$3TiCl_4 + TiO + C \rightarrow 4TiCl_3 + CO$$

The reactions are advantageously carried out at temperatures, above about 800° C., and preferably between about 1000° C. and about 1500° C. The higher temperatures are more favorable in that the yield of $TiCl_3$ increases with increasing temperature. Under these elevated temperature conditions (unless, of course, very high pressures are utilized) the reaction is one between gaseous titanium tetrachloride, solid titanium oxides, and solid carbon to yield the gaseous products, titanium trichloride and carbon monoxide. Accordingly, a preferred embodiment of the invention comprises passing titanium tetrachloride vapors over a solid mixture of titanium oxide and carbon at elevated temperature and recovering a gaseous mixture containing titanium tetrachloride, titanium trichloride and carbon monoxide. The reaction is preferably carried out at about atmospheric pressure, but can be carried out at lower or higher pressures.

The preferred oxide of titanium for the present reactions is titanium dioxide, which may be utilized in its pure form, or as it occurs naturally in the form of ilmenite ores or rutile. The ores can, if desired, be treated by well-known methods to increase the concentration of the titanium dioxide therein.

In order to facilitate the reaction of this invention, the titanium oxides and carbon should be pulverized (to about 60 mesh and preferably smaller) and admixed together in a sufficiently porous form to allow intimate contacting of the two solids and the titanium tetrachloride gas.

The products of the present reaction will be a gaseous mixture containing titanium trichloride, titanium tetrachloride and carbon monoxide; but the vapor pressure of titanium trichloride decreases relatively sharply with decreasing temperature, so that the trichloride can be separated from the other gases by cooling to condense titanium trichloride as a solid. If such a separation is desired, however, special precautions must be taken to minimize the effect of the possible reaction between carbon monoxide and titanium trichloride, which reaction may be represented by the following equation in which the letters $g$ and $s$ in parentheses indicate the physical state of the various reactants and products to be either gaseous or solid:

(Eq. 3)
$$8TiCl_3(g) + CO(g) \rightarrow 6TiCl_4(g) + TiO(s) + TiC(s)$$

The equilibrium constant of the reaction indicated by Equation 3 increases with decreasing temperature. Therefore, if the gaseous reaction products containing the titanium trichloride and carbon monoxide are slowly cooled, the trichloride will be substantially completely converted to other compounds. This difficulty can be minimized by the method disclosed and claimed in our copending application, Serial No. 318,102, filed on even date herewith, which involves cooling the reaction products very rapidly to form solid titanium trichloride before the reaction of Equation 2 has an opportunity to proceed to any appreciable extent.

If a product of exceptionally high purity is required (such as would be desirable if the titanium trichloride were to be utilized in a disproportionation reaction to produce metallic titanium), the solid trichloride may be further purified by sublimation into an atmosphere of titanium tetrachloride (to prevent decomposition) and recondensation.

It should be understood that the preceding described procedure for recovery of titanium trichloride is not absolutely necessary for the practice of the present invention, since the trichloride produced according to the present invention may be further processed or utilized as a gas, without recovering it as a solid. The unreacted titanium tetrachloride in the gaseous products can be recovered and recycled to the reaction zone, thereby effecting a material saving as to raw materials for the process.

The following is an illustrative example of how the process of the present invention may be carried out.

Example

Gaseous titanium tetrachloride at about one atmosphere of pressure was passed over a powdered (200 mesh) mixture of about 23 weight per cent of carbon and about 77 weight per cent of titanium dioxide in a quartz tube at about 1050° C. The exit end of the tube was maintained at a lower temperature so that the reaction gases were rapidly cooled to below 500° C. when passing through the cooler portion of the tube. The titanium trichloride which was formed by contacting the solids with the tetrachloride was recovered as a solid crystalline deposit in the cooler portion of the quartz tube.

What we claim is:

1. The method of producing titanium trichloride which comprises contacting a solid mixture of titanium oxide and carbon with gaseous titanium tetrachloride in a reaction zone at an elevated temperature sufficiently high to form a gaseous mixture containing substantial amounts of titanium trichloride and carbon monoxide, and sufficient unreacted titanium tetrachloride to stabilize said titanium trichloride, and subsequently recovering said titanium trichloride from said gaseous mixture.

2. The method of producing titanium trichloride which comprises contacting a solid mixture of titanium oxide and carbon with gaseous titanium tetrachloride in a reaction zone at a temperature above about 800° C., withdrawing a gaseous mixture of titanium tetrachloride, titanium trichloride, and carbon monoxide, and subsequently recovering titanium trichloride from said gaseous mixture.

3. The method of producing titanium trichloride which comprises passing gaseous titanium tetrachloride into a reaction zone with solid titanium dioxide and carbon at a temperature in excess of about 800° C., passing the reaction gases from said zone, separating the unreacted titanium tetrachloride from the titanium trichloride and recycling said unreacted titanium tetrachloride to said reaction zone.

4. The method of producing titanium trichloride which comprises passing gaseous titanium tetrachloride into a reaction zone with solid titanium dioxide and carbon at a temperature in excess of about 800° C., passing the reaction gases from said zone, and rapidly passing said gases into a cooling zone at a temperature below about 650° C. to condense solid titanium trichloride from said gases, separating the unreacted titanium tetrachloride from the remainder of said gases and recycling said unreacted titanium tetrachloride to the aforesaid reaction zone.

References Cited in the file of this patent

UNITED STATES PATENTS

| | | |
|---|---|---|
| 2,184,884 | Muskat et al. | Dec. 26, 1939 |
| 2,401,543 | Brallier | June 4, 1946 |
| 2,486,912 | Belchetz | Nov. 1, 1949 |
| 2,555,374 | Rowe et al. | June 5, 1951 |
| 2,616,784 | Reimert | Nov. 4, 1952 |

OTHER REFERENCES

J. W. Mellor's "A Comprehensive Treatise on Inorganic and Theoretical Chem.," vol. 7, 1927 ed., page 76. Longmans, Green and Co., New York.